H. H. FRICK.
SET SCREW.
APPLICATION FILED APR. 22, 1919.
1,330,792.
Patented Feb. 17, 1920.
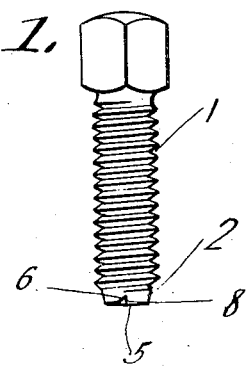
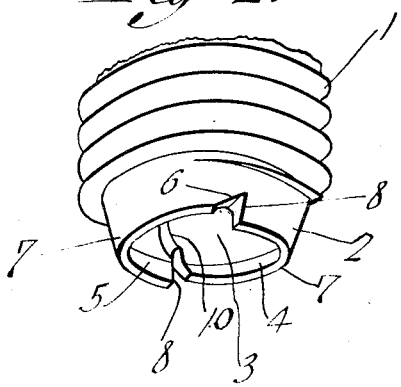
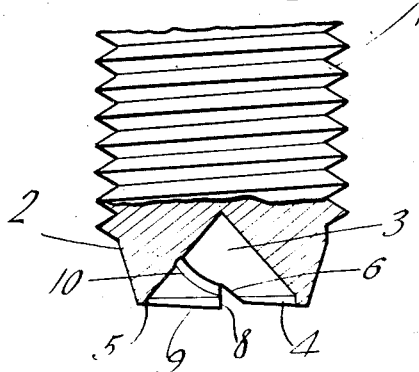
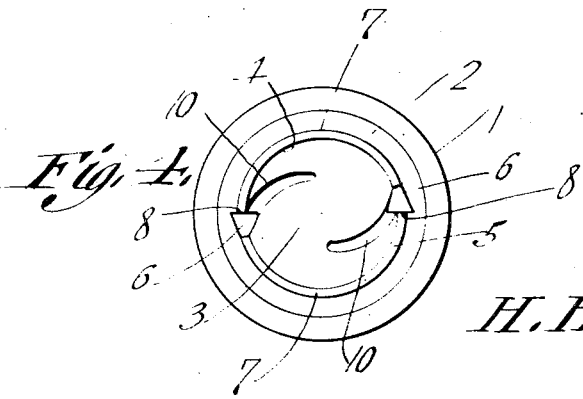
H. H. Frick
Inventor

UNITED STATES PATENT OFFICE.

HENRY H. FRICK, OF FRICKS, PENNSYLVANIA.

SET-SCREW.

1,330,792.     Specification of Letters Patent.     Patented Feb. 17, 1920.

Application filed April 22, 1919. Serial No. 291,820.

*To all whom it may concern:*

Be it known that I, HENRY H. FRICK, a citizen of the United States, residing at Fricks, in the county of Bucks and State of Pennsylvania, have invented a new and useful Set-Screw, of which the following is a specification.

The device forming the subject matter of this application is a set screw adapted to hold fly wheels, pinions, pulleys, propellers and the like, on a shaft, and it is the object of the invention to provide a set screw, so constructed at one end that the screw will cut into the shaft and turn up a shaving, which, entering a notch, will hold the screw against rotation, the notch forming a cutter which turns off the shaving.

It is within the province of the disclosure, further, to improve set screws, structurally, as will be hereinafter described.

Within the scope of what is claimed, changes may be wrought by a mechanic, without departing from the spirit of the invention or placing the utility of the invention in jeopardy.

In the drawings:—Figure 1 shows in side elevation, a set screw constructed in accordance with the invention; Fig. 2 is a perspective depicting the working end of the screw; Fig. 3 is an enlarged fragmental side elevation, wherein parts appear in section; Fig. 4 is an elevation showing the working end of the screw.

The numeral 1 denotes a set screw having a tapered end 2 in which a conical recess 3 is located, there being, in the extreme end of the part 2, a short cylindrical bore 4 communicating with the recess, the bore and the recess defining a rim 5, there being notches 6 in the rim, separating the rim into circumferential ribs 7 and forming cutters 8 at one end of each rib. The end surfaces of the ribs 7 are inclined circumferentially of the screw, so that the cutters 8 may exercise their function. If desired, spiral grooves 10 may be formed in the wall of the recess 3, the grooves leading to the notches 6.

When the screw 1 is rotated to a seat, the cutters 8 will turn off shavings, which, entering the notches 6, will hold the screw against rotation, the working end of the screw cutting its way into the shaft. Should there be an overplus of material produced or loosened by the cutters 8, the material will be carried away into the recess 3 by the grooves 10. Since the screw is provided with the cylindrical bore 4, the ribs 7 will cut readily into the shaft, and the screw can be rotated enough to cause the ribs to cut into the shaft, before the constituent material of the shaft reaches the wall of the conical recess 3 and impedes rotation.

I claim:—

1. A set screw having, in its end, a recess defining a rim, there being notches in the rim, separating the rim into circumferential ribs and forming cutters at one end of each rib, the end surfaces of the ribs being inclined circumferentially of the screw.

2. A set screw, constructed as set forth in claim 1, and further characterized by the fact that grooves are formed in the wall of the recess, the grooves leading to the notches.

3. A set screw provided with a conical recess and having, in its extreme end, a cylindrical bore communicating with the recess, the bore and the recess defining a rim, there being notches in the rim, separating the rim into circumferential ribs and forming cutters at one end of each rib, the end surfaces of the ribs being inclined circumferentially of the screw.

In testimony that I claim the foregoing as my own, I have hereto affixed my signature.

HENRY H. FRICK.